(12) United States Patent
Ekberg

(10) Patent No.: US 7,280,820 B2
(45) Date of Patent: Oct. 9, 2007

(54) SYSTEM AND METHOD FOR AUTHENTICATION IN A MOBILE COMMUNICATIONS SYSTEM

(75) Inventor: Jan-Erik Ekberg, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/293,188

(22) Filed: Dec. 5, 2005

(65) Prior Publication Data

US 2006/0073811 A1    Apr. 6, 2006

Related U.S. Application Data

(63) Continuation of application No. 09/743,302, filed as application No. PCT/FI99/00565 on Jun. 24, 1999, now Pat. No. 7,003,282.

(30) Foreign Application Priority Data

Jul. 7, 1998    (FI) .................................... 981565

(51) Int. Cl.
*H04M 1/66* (2006.01)
(52) U.S. Cl. ..................... 455/411; 455/410
(58) Field of Classification Search ................ 455/410, 455/411, 432.3, 433; 380/277, 279, 255, 380/270; 713/151, 152, 168, 200, 201, 202
See application file for complete search history.

(56) References Cited

U.S. PATENT DOCUMENTS

| 5,625,671 | A | 4/1997 | Salin |
| 5,729,537 | A | 3/1998 | Billstrom |
| 5,864,757 | A | 1/1999 | Parker |
| 6,061,346 | A | 5/2000 | Nordman |
| 6,088,451 | A | 7/2000 | He et al. |
| 6,148,192 | A | 11/2000 | Ahvenainen |
| 6,148,402 | A | 11/2000 | Campbell |
| 6,466,780 | B1 | 10/2002 | Geiselman et al. |
| 6,496,704 | B2 | 12/2002 | Yuan |

FOREIGN PATENT DOCUMENTS

| WO | WO97/45814 | 12/1997 |
| WO | WO98/32301 | 7/1998 |
| WO | WO98/44402 | 10/1998 |

*Primary Examiner*—George Eng
*Assistant Examiner*—Sam Bhattacharya
(74) *Attorney, Agent, or Firm*—Squire, Sanders & Dempsey L.L.P.

(57) ABSTRACT

The present invention provides an authentication method and apparatus for authenticating an identity of a subscriber attached to a network. According to the invention, in a network terminal, a subscriber identity module is used so that a response is obtained as a result of a challenge given to the identity module as input. A special security server in the network is also used so that when a terminal attaches to the network, a message of a new user is transmitted to the security server. Subscriber authentication information corresponding to the new user is fetched from the mobile communications system to the network, wherein the authentication information includes at least a challenge and a response. Authentication is performed based on the authentication information obtained from the mobile communications system by transmitting the challenge to the terminal through the network, by checking at the terminal that the challenging is unique from challenges used in previous authentication exchanges, by generating, if the challenge is unique, a response from the challenge in the identity module of the terminal and by comparing the generated response with the response received from the mobile communications system.

30 Claims, 5 Drawing Sheets

SYSTEM AND METHOD FOR AUTHENTICATION IN A MOBILE COMMUNICATIONS SYSTEM

Figure 1:
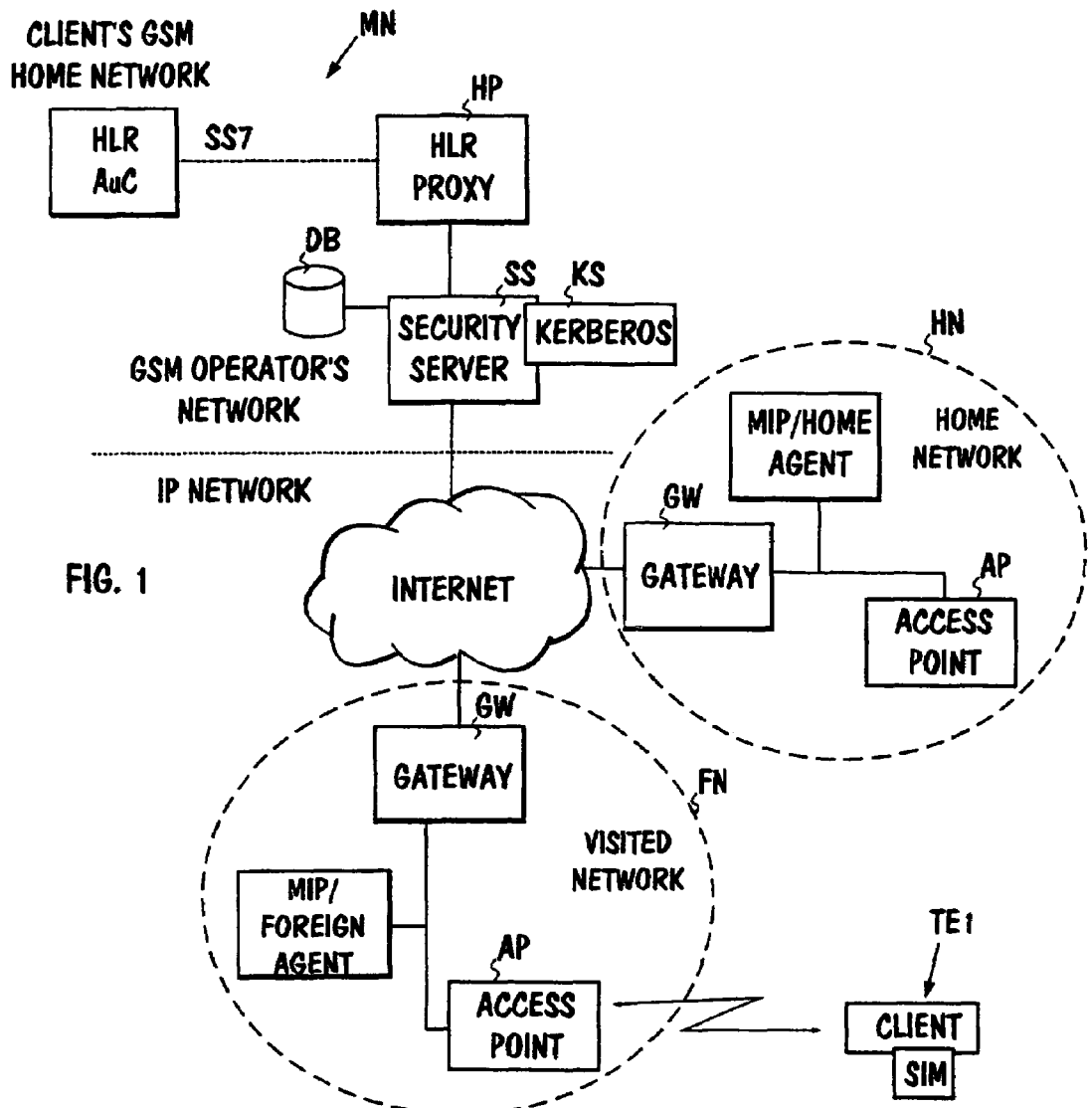

This is a Continuation of application Ser. No. 09/743,302 filed Mar. 8, 2001 now U.S. Pat. No. 7,003,282, which is a 371 application of International Application PCT/FI99/00565 filed Jun. 24, 1999. The disclosure of the prior application is hereby incorporated by reference herein in its entirety.

FIELD OF THE INVENTION

The invention relates to authentication in a telecommunications network, especially in an IP network (IP=Internet Protocol), and also to improvement of the network's data security features with the aid of the performed authentication. Authentication means verification of the identity of the party, such as the subscriber, who has generated data. Using authentication it is also possible to guarantee integrity and confidentiality of the said data. Authentication may be performed for various purposes, such as for checking the right of use of network services. The invention is intended for use especially in connection with mobile terminals, but with the solution according to the invention advantages are also achieved in connection with fixed terminals.

BACKGROUND OF THE INVENTION

The strong growth in number of Internet users has been one of the most remarkable phenomena in communications in recent years. The rapid growth has also highlighted defects on the Internet. One of these is the poor data security of the network. The IP protocol version (IPv4) now in general use does not provide any such means, with which it would be possible to make sure that information arrived from the opposite end did not change during the transfer or that the information did in fact arrive from that source, who claims to have sent the information in question. In addition, it is easy to use various tools in the network for listening in to the traffic. For these reasons, those systems are very vulnerable which transmit non-encrypted critical information, e.g. passwords.

The new IP version (IPv6) has internal characteristics that allow safe communication between Internet users. Because the transition to the new protocol will be slow, the data security features should be such that they are compatible with the present IP version (IPv4), and so that they can be added to this.

Various such systems have been developed to improve the data security properties of the Internet where users can send the information encrypted to the other party. One such system is the Kerberos, which is a service with which network users and services can authenticate one another and with which users and services can bring about encrypted connections between each other. The Kerberos system is utilised in one embodiment of the present invention which will be described more closely hereinafter.

Another current trend is the strongly increasing use of various mobile terminals. Along with this trend it is even more important that the terminals will have access to the data network also when being located outside their own home network. Such an access can essentially improve the usability of e.g. a portable computer, when the user is not in his/her usual working environment Points of access may be located e.g. at airports, in railway stations, in shopping malls or on any other public premises, and the access may be wired or wireless.

Systems of the described kind, which can be used for sending encrypted information between parties, are mainly intended for fixed terminals and they require that the users are registered in advance as users of the service. It is a problem nowadays that for IP networks supporting mobility of the terminals there is no such existing and functioning authentication or key management system that would guarantee good geographical coverage and at the same time allow the user easily to have an authenticated and safe connection available to himself/herself in an area which is geographically as large as possible.

SUMMARY OF THE INVENTION

It is a purpose of the invention to eliminate the drawback described above and to bring about a solution, with which users of a telecommunications network, such as an IP network, can be simply and smoothly authenticated, almost irrespectively of where their network access point is located geographically at each time.

This objective is achieved through the solution defined in the independent claims.

The invention utilizes the authentication method of an existing mobile communications network, especially the GSM network (Global System for Mobile Communications), in an IP network (or in any other network which is separate from the mobile communications network). This means that a user of the IP network in his IP network terminal uses the same (or an essentially similar) subscriber identification unit (SIM) as in his mobile phone or station. The idea is to fetch the subscriber's authentication data from the mobile communications network over to the IP network side and to carry out the authentication in the IP network based on this data. The mobile network is not necessarily a GSM network, but it may be some other mobile communications network, wherein authentication is used essentially in the same manner, e.g. a DCS network (Digital Cellular System), a GPRS network (General Packet Radio Service, which is a sub-network of the GSM) or a UMTS network (Universal Mobile Telecommunications System).

In an advantageous embodiment of the invention, the user is registered in response to a successful authentication into a separate key management system, preferably a Kerberos system, whereby it is possible then easily to bring about an encrypted channel between users communicating with one another. This is especially important when at least a part of the transmission path consists of a radio path.

Owing to the solution according to the invention, users of the IP network are easily and smoothly authenticated and, in addition, the users are able to avail themselves of efficient security features in a geographically large area. This is due both to the widespread use of GSM networks and to the fact that roaming agreements between operators allow authentication of subscribers entering a foreign network. E.g. today (1998) a Finnish GSM operator has common traffic agreements with operators working in more than 60 countries.

Owing to the solution according to the invention, ISP (Internet Service Provider) operators typically also providing mobile communication services need not separately procure authentication and key management systems in the IP network, but they may use also for this purpose the features of the mobile communications network which they operate.

With the solution according to the invention such an advantage is also achieved in connection with fixed terminals, that functions built in connection with the mobile communications network can be utilised in connection with Internet services. E.g. an organisation working both as a mobile communication operator and as an ISP operator may use charging services built in connection with the mobile communications network for charging for the Internet services which he provides. When also fixed terminals are authenticated with the method according to the invention, much certainty is achieved that the bill will be directed at the correct subscriber. In addition, the subscriber can be authenticated, even if he attaches to the network from a foreign terminal.

A BRIEF DESCRIPTION OF THE DRAWINGS

Figure 2:
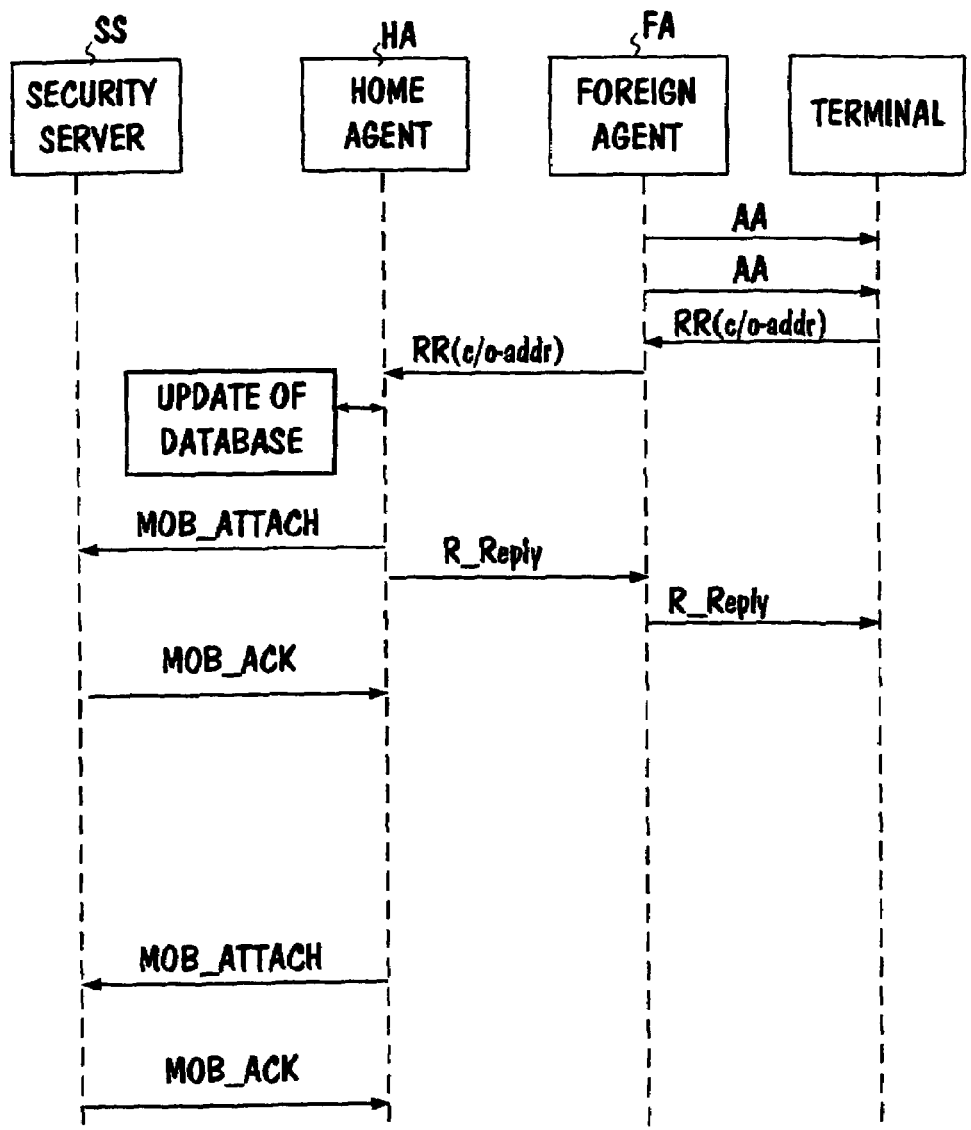
Figure 3:
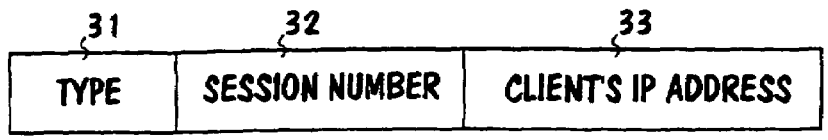
Figure 4:
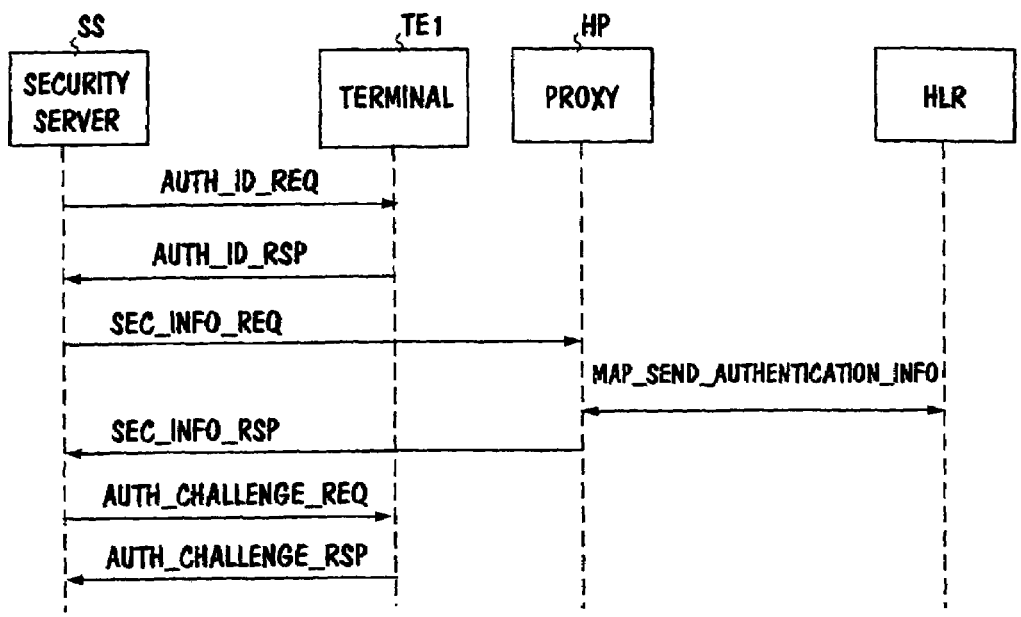
Figure 5:
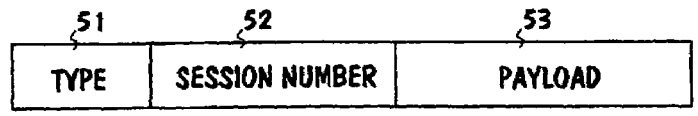
Figure 6:
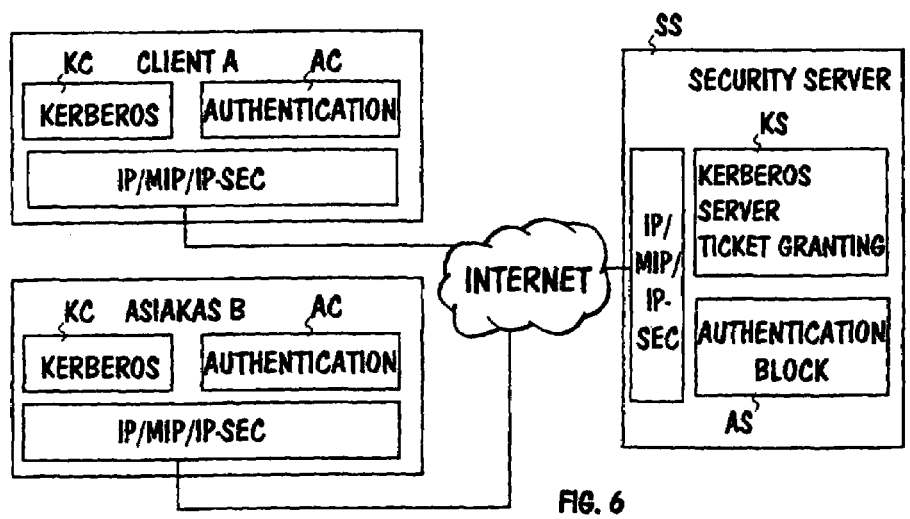
Figure 7:
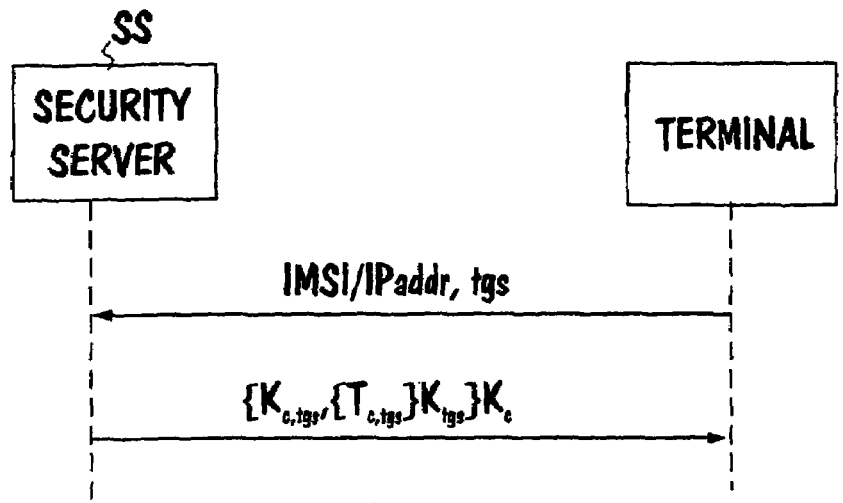
Figure 8:
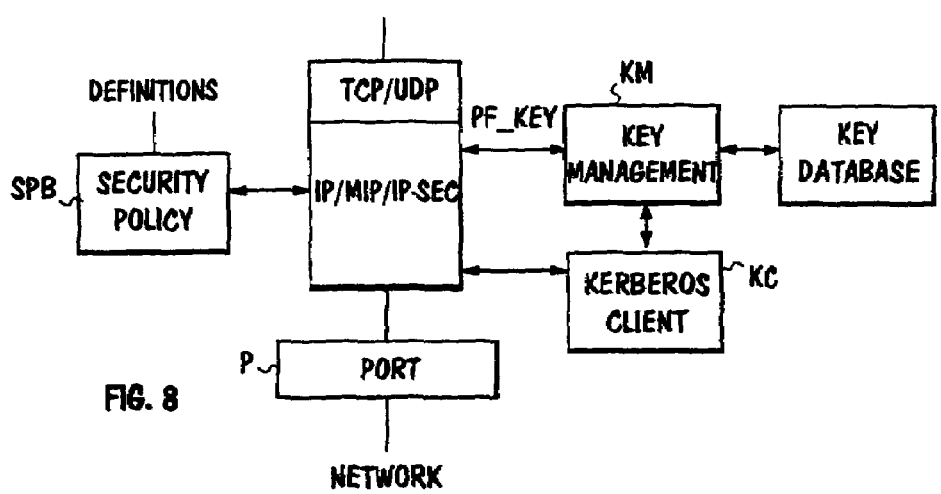
Figure 9:
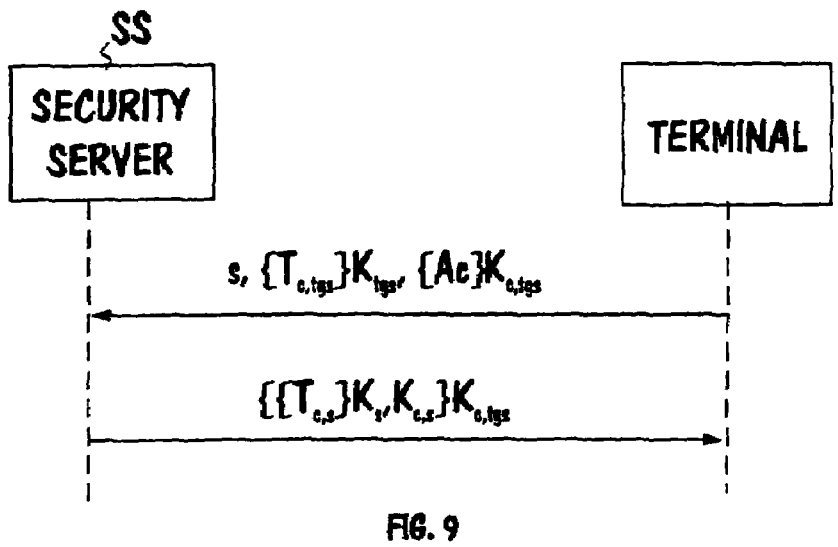
Figure 10:
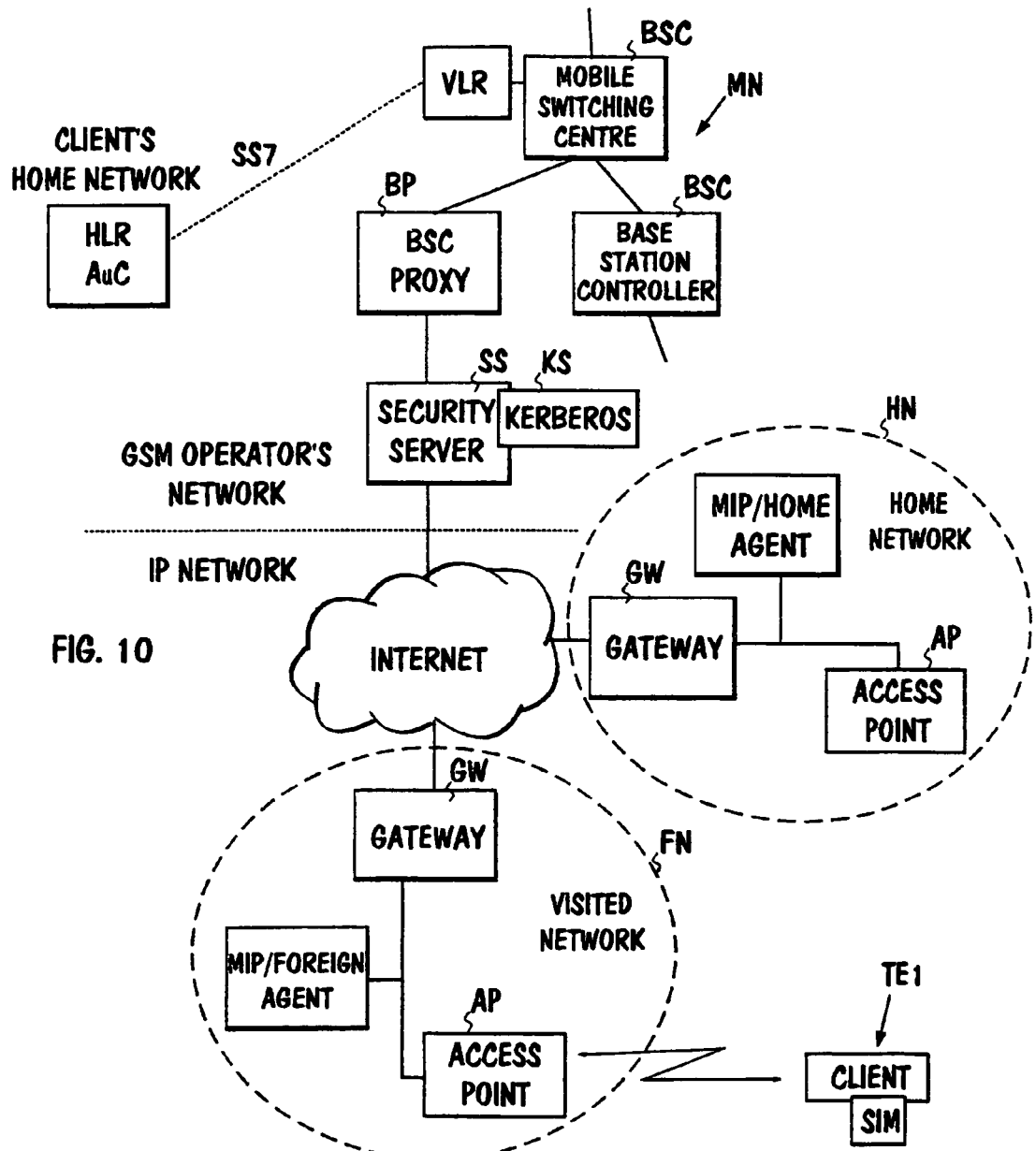

In the following, the invention and its preferred embodiments will be described more closely referring to the examples shown in FIGS. 1 ... 10 in the appended drawings, wherein FIG. 1 illustrates an operating environment of the method in accordance with the invention, FIG. 2 shows an exchange of messages between various elements, when the terminal attaches to the network or detaches from the network, FIG. 3 illustrates the structure of those messages, with which the server of the system is told that the user has attached to the network or has detached from the network, FIG. 4 shows an exchange of messages taking place between the various elements during authentication, FIG. 5 illustrates the general structure of the messages shown in FIG. 5, FIG. 6 illustrates those elements of the system, which are used for acquiring a connection-specific encryption key between two terminals, FIG. 7 shows an exchange of messages taking place in order to obtain an initial ticket from the Kerberos server, FIG. 8 illustrates those parts of a terminal which are essential from the viewpoint of the invention, FIG. 9 shows an exchange of messages taking place in order to obtain an encryption key for communication between two terminals, and FIG. 10 illustrates an alternative embodiment of the system.

DETAILED DESCRIPTION OF THE INVENTION

In the following the invention will be described with reference to a network environment, wherein mobility of the subscribers is supported with the aid of a Mobile IP protocol (MIP hereinafter). The MIP is such a version of the existing IP, which supports mobility of the terminals. (The MIP principle is described e.g. in the RFC 2002, October 1996, or in the article Upkar Varshney, *Supporting Mobility with Wireless ATM,* Internet Watch, January 1997.)

The MIP is based on the idea that each mobile host or mobile node has an agent (home agent) allocated for itself, which relays packets to the current location of the mobile node. When the mobile node moves from one sub-network into another, it registers with the agent (foreign agent) serving the concerned sub-network. The last-mentioned performs checks with the mobile node's home agent, registers the mobile node and sends the registration information to it. Packets addressed to the mobile node are sent to the mobile node's original location (to the home agent), thence they are relayed further to the current foreign agent, which will forward them to the mobile node.

FIG. 1 shows a typical operating environment of the method in accordance with the invention. The heart of the system is the security server SS, which is connected both to the Internet and to a proxy server HP, which has access to a separate mobile network MN, which in this example is a GSM network. The proxy server forms a network element, which (in a manner to be described later) relays traffic between the security server and the home location registers HLR of mobile communications networks, which home location registers HLR are located in the home networks of the subscribers. In practice, both the proxy server and the security server are located on the premises of the network operator, e.g. in the same room, so that even if there is an IP connection between the security server and the proxy server, it is a secured connection. As the GSM network is known as such and the invention does not require any changes to be made in it, it is not described more closely in this connection.

Users moving in the area of the system can use portable computers, PDA equipment, intelligent phones or other such terminals. Only one terminal TE1 is illustrated by reference mark CLIENT in the figure. For the present purposes, client generally means an object using the services provided by the network and carried out by the network servers. Client often means a program which connects with a server on behalf of the network user.

Two sub-networks are shown in the figure and in practice they may be e.g. Ethernet local area networks, wherein TCP/IP packets are transmitted: the user's home network HN and the foreign network FN, to which terminal TE1 is assumed to be connected. These sub-networks are both connected to the Internet by way of a gateway GW (a router). The home network includes the home agent HA of the said mobile host and the foreign network correspondingly includes the foreign agent FA. Accesses to the sub-networks take place through access points AP, e.g. in a wireless manner, as is shown in the figure.

The terminals are formed by two parts in the same way as the ordinary GSM telephone: of the subscriber device proper, e.g. a portable computer (with software) and of the SIM (Subscriber Identity Module), whereby from the viewpoint of the network the subscriber device becomes a functioning terminal only when the SIM has been pushed into it. In this case described as an example, the SIM is the subscriber identity module for use in the GSM network. A terminal may have access only to the IP network, or it may be a so-called dual mode device, which has access both to the IP network and to the GSM network. The access to the IP network takes place e.g. with the aid of a LAN card in the terminal and to the GSM network with the aid of a GSM card, which in practice is a stripped telephone, which is located e.g. in the computer's PCMCIA expansion slot.

In a preferred embodiment of the invention, there is also a Kerberos server KS in connection with the security server which is known as such and which is used for implementing encrypted connections in a manner to be described hereinafter. The security server and the Kerberos server may be physically in the same machine.

For the security server to know when the user enters or exits the IP network, a channel is brought about between the security server and the home agent in the manner shown in FIG. 2. In accordance with the MIP protocol, foreign agent FA continuously sends broadcast messages to its own sub-network, which messages are called by the name of "agent advertisement" and which are indicated by the reference mark AA in the figure. When the terminal attaches to the said sub-network, it will receive these messages and conclude from them whether it is in its own home network or in some other network. If the terminal finds that it is in its home network, it will function without any mobility services. Otherwise the terminal will get a care-of address in the foreign network in question. This address is the address of that point in the network to which the terminal is temporarily connected. This address at the same time forms the termination point of the tunnel leading to the said terminal. Typically, the terminal gets the address e.g. from the above-mentioned broadcast messages, which the foreign agent is sending. Thereupon the terminal sends a RR (Registration Request) to its own home agent through foreign agent FA. The message contains, among other things, that care-of address, which the terminal just received. Based on its received request message, the home agent updates the said terminal's location information in its database and through the foreign agent it sends a Registration Reply R_Reply to the terminal. In the reply message there is all the necessary information indicating how (on what conditions) the home agent has accepted the registration request.

All the messages between the terminal, the foreign agent and the home agent which were described above are normal messages in accordance with the MIP protocol. The mobile node may also register directly with the home agent. The above-mentioned RFC describes the rules, which determine whether the mobile node will register directly with the home agent or through the foreign agent. If the mobile node gets a care-of address in the manner described above, the registration must always be made through the foreign agent. According to the MIP protocol, authentication is also performed in connection with the registration with the purpose to reduce the occurrence of errors in connection with the registration. The registration is based on a check value calculated from the registration message (from the registration request or reply), and the registration must be made only between that mobile node and that home agent, which have a shared fixed key (which is agreed upon in advance). Under these circumstances, the foreign agent is not necessarily able to authenticate the mobile node. This problem is aggravated, if as large a geographical coverage as possible is an objective in the system.

According to the invention, a facility is added to the home agent to the effect that the home agent provides the security server with information about the terminal attached to the network, after the registration request message has arrived from the foreign agent. This message is indicated in the figure by reference mark MOB_ATTACH. Correspondingly, the home agent provides the security server with information about the terminal which has left the network after the terminal has detached from the network (after the terminal has detached from the network or after the lifetime of the address given to it has run out). In the figure, this message is indicated by the reference mark MOB_DETACH. To each type of message the security server sends an acknowledgement message (MOB_ACK). As regards their purpose of use, the MOB_ATTACH and MOB_DETACH messages correspond to the IMSI attach/detach procedures used in a GSM network.

The home agent monitors the replies arriving from the security server and sends the messages again (with the same parameters), should no acknowledgement message arrive from the security server within a predetermined time, e.g. 30 seconds.

FIG. 3 illustrates the structure of the MOB_ATTACH, MOB_DETACH and MOB_ACK messages. In the messages there is a type field 31, which identifies the type of the message, a number field 32, which contains the random number or sequence number identifying the session, and an address field 33; which contains the client's IP address. The last-mentioned field is absent from the acknowledgement message. The messages are transmitted in fields reserved for the payloads of IP datagrams.

Thus, when the terminal has attached to the network, the security server receives from the home agent information about the IP address of the concerned terminal. Thereupon follows authentication of the client, which will be described in the following with reference to FIG. 4. For the authentication, the security server first asks the client for the IMSI (International Mobile Subscriber Identity), which is stored on the SIM (the AUTH_ID_REQ message). To this the client replies by giving his IMSI (which is a 9-byte identifier in accordance with the GSM specification) in the AUTH_ID_RSP reply message. The inquiry travels through the home agent to the termination point of the above-mentioned tunnel, but the reply comes directly from the terminal to the security server.

If the client's IP address does not change often, it is preferable to store in the security server the IMSI identifiers corresponding to the IP addresses, whereby identifiers need not be moved around unnecessarily in the network. Thus, the above-mentioned messages are not necessary.

When the terminal has stated its IMSI identifier or when the security server has fetched it from its database, the security server starts the actual authentication. To enable authentication of the terminal's SIM, there must be a connection between the security server and the AuC (Authentication Center) located in connection with the home location register HLR of the subscriber's own GSM network. This is implemented with a proxy server HP, which functions as a connecting network element between the IP network and the GSM network, more precisely between the IP network and the SS7 signaling network utilized by the GSM network. The GSM network service needed in the authentication is MAP_SEND_AUTHENTICATION_INFO (GSM 9.02, v. 4.8.0). This service is implemented by using the proxy server HP, which may be located on the premises of the local GSM operator. The security server transmits to the proxy server a SEC_INFO_REQ authentication request message, which contains a session identifier and the IMSI subscriber identifier. The proxy server for its part transmits to the authentication centre AuC an inquiry message in accordance with the MAP (Mobile Application Part) protocol, which inquiry message is used to request an authentication triplet and which is normally transmitted between the VLR and the HLR. In response to this inquiry message, the HLR returns to the proxy server a normal authentication triplet, which contains a challenge (RAND), a response SRES (Signed Response) and a key Kc (the connection-specific encryption key used in the GSM network). The proxy server relays the triplet further to the security server in a SEC_INFO_RSP message. The security server stores the triplet and transmits the challenge (the AUTH_CHALLENGE_REQ message) further to the terminal's SIM, which based on this message generates a response (SRES) and a key Kc. The terminal stores the key and transmits the response (the AUTH_CHALLENGE_RSP message) (SRES) back to the security server.

In the terminal there is preferably a database, wherein the challenges are stored. In this way it is possible to make sure that one challenge will be used just once. In this manner it is possible to prevent anyone from pretending to be a security server by snatching from the network the (non-encrypted) challenge and the response and by finding out the key Kc from these. If the same challenge occurs once again, no reply will be given to this challenge. The security server may also filter out those challenges which have already been used, and when required it may ask for a new authentication triplet from the GSM network, so that no such challenge which has already been used will be transmitted to the terminal.

The proxy server HP functions in the system as a virtual visitor location register VLR, because at least as regards the authentication triplet inquiries it appears from the home register like a network element of the same kind as the genuine visitor registers of the GSM network. The proxy server also functions as a filter allowing access to the GSM system's signaling network only to authentication triplet inquiries. The proxy server does not either interfere with any other inquiries from the home register on the GSM network side.

FIG. 5 illustrates the general structure of the messages presented in FIG. 4. In the messages there is a type field 51, which identifies the type of the message, a number field 52, which contains the random number or sequence number identifying the session, and a payload field 53, the length of which varies depending on which message is at issue. In messages between the security server and the terminal; the two first fields occur in all messages, but there is no payload field in the AUTH_ID_REQ message. In the AUTH_ID_RSP message the length of the payload field is 9 bytes (the length of IMSI is 1+8 bytes), in the AUTH_CHALLENGE_REQ message its length is 16 bytes (the length of RAND is 16 bytes) and in the AUTH_CHALLENGE_RSP message its length is 4 bytes (the length of SRES is 4 bytes). In the messages between the security server and the proxy server, the length of the payload field is 9 bytes (IMSI) in the case of the SEC_INFO_REQ message and n×28 bytes in the case of the SEC_INFO_RSP message (in the triplet there is a total of 28 bytes and the network elements are generally configured so that they will transmit 1 . . . 3 subscriber-specific triplets at a time). As mentioned above, normal GSM network signaling is used between the proxy server and the home location register HLR.

The security server compares the response it received from the terminal with the response arrived in the triplet and, if it is found in the comparison that the responses are the same, the authentication is successful.

In response to a successful authentication, the security server starts a registration with the Kerberos server. In this context the Kerberos server means a process, which provides a Kerberos service. The Kerberos server is preferably located in connection with the security server, as is shown in FIG. 1.

Kerberos is a system intended for authentication of network users and services. It is a trusted service in the sense that its every client trusts that the system's assessment of all its other clients is correct. Since the Kerberos system is known as such, and its operation is not changed in any way, it will not be described in detail in this context. The system is described e.g. in the document Steiner, Neuman, Schiller Kerberos: An Authentication Service for Open Network Systems, Jan. 12, 1988, from which the interested reader may find background information, if he so desires. In the following description the same ways of marking will be used as in the above-mentioned document. The description is based on the Kerberos version 4.

c→client,
s→server
c-addr→client's network address
tgs→ticket-granting server
$K_x$→x's private key
$K_{x,y}$→session key for x and y $\{abc\}K_x$→abc encrypted using x's personal key
$T_{x,y}$→x's ticket for using y.

FIG. 6 illustrates the objects of the Kerberos and authentication applications. It is assumed in the figure that the system has two clients, A and B. Each client may be a terminal, which has been authenticated by the security server in the manner described above, when it attached to the IP network, or one may be a "permanently" authenticated client, e.g. a server. The Kerberos application includes two parts: client program KC, which is located at the terminal, and server program KS, which is located at the security server. The server program also includes a ticket-granting server TGS. Correspondingly, the authentication application includes two parts: the client program AC, which is located at the terminal, and the server program AS, which is located at the security server. Communication takes place with the aid of IP/MIP/IP-SEC stacks, which will be described in greater detail below.

The following is a description of how the Kerberos protocol is used for bringing about a connection-specific key between terminals A and B.

When the security server has found that the authentication was successful, it will start registration of the Kerberos client with the Kerberos server. In practice, this happens in such a way that the security server's authentication block AS registers the key Kc arrived in the authentication triplet (a) as the client's password and (b) as a password into the service formed for the client's IP address or for the IMSI subscriber identifier. The service is given some name which is determined in advance.

Then the client may request a ticket for the ticket-granting server using the key Kc. This exchange of messages is shown in FIG. 7. After the client has received the key Kc, it transmits to the security server (to the Kerberos server) a message, with which it requests an initial ticket of the Kerberos system. There may be a brief predetermined delay between the reception of the key and the transmission of the message, so that the security server will have time first to perform the registration with the Kerberos server. After the delay, the terminal transmits to the security server a request in accordance with the Kerberos protocol, which always contains the client's identity (the IMSI or IP address) and the name tgs of a certain special service, the ticket-granting service. Upon receiving this inquiry the Kerberos server checks whether it knows the client. If it does, it will generate a random connection-specific key $K_{c,tgs}$, which will be used later in data transmission between the client and the ticket-granting server. Thereupon the Kerberos server generates a ticket $T_{c,tgs}$, with which the client may use the ticket-granting service. This ticket contains the client's name, the name of the ticket-granting server, the current time of day, the lifetime of the ticket, the client's IP address and the connection-specific key just generated. Using the methods of marking described above, the contents of the ticket can be presented as follows $T_{c,tgs}=\{c, tgs, timestamp, lifetime, c\text{-addr}, K_{c,tgs}\}$. This ticket is encrypted using key $K_{tgs}$, which is known only to the ticket-granting server and to the Kerberos server. Then the Kerberos server transmits as a response to the client a packet, which contains the encrypted ticket and a copy of the connection-specific key $K_{c,tgs}$. The response is encrypted using the clients own key Kc. The terminal stores the ticket and the session key for future use.

When the terminal has stored the ticket and the session key, it has access during the tickets lifetime to the ticket-granting service and it is prepared to be in connection with a third party.

FIG. 8 illustrates those functional blocks of a terminal, which are essential from the viewpoint of the invention. The terminal is in connection with the network by way of the IP/MIP/IP-SEC protocol stack. IP/MIP/IP-SEC is such a known TCP/IP stack, which has built-in mobile IP characteristics and encryption functions. Seen from above, this stack appears just like an ordinary IP stack, but from below (from the network side) the said stack transmits encrypted information in accordance with a certain security policy. This security policy is determined by a separate security policy block SPB, which controls the IP/MIP/IP-SEC stack by indicating to the stack the other objects in the network to which encrypted information must be sent. These objects are generally defined in the security policy block with the aid of the terminal's IP address and port number. The definition can be made even finer by also defining those user identifiers, for which the encryption is done. In practice, the security policy block is built into the IP/MIP/IP-SEC stack, but in a functional sense it is a block in its own right.

In addition to the security policy block, the terminal contains a key management block KM, which attends to management of keys. In connection with the key management block there is a database containing all the encryption keys used by the terminal. The key management block can be implemented e.g. with the aid of the known PF_KEY API (API=Application Programming Interface). PF_KEY is a generic application programming interface, which may be used not only for IP layer security services, but also for other security services of the network. This API determines the socket protocol family, which the key management applications use to communicate with parts of the operating system relating to the key management. Since the invention is not related to the known PF_KEY protocol, it will not be described more closely in this context. The protocol is described in the document McDonald, Metz, Phan: PF_KEY Management API, version 2, 21 Apr. 1997, where the interested reader will find background information.

In the key management block KM there are specific definitions for how and with which key the encryption is carried out to each network address. This definition may be made e.g. so that for each individual IP address and port that protocol and that key are stated which must be used when in connection with the port in question.

When a packet which is to be transmitted outwards arrives in the IP/MIP/IP-SEC stack, the stack reads the packets destination address and asks the security policy block SPB which is the encryption policy as regards a packet carrying the address in question. In response, the security policy block tells the IP/MIP/IP-SEC stack whether encryption is to be made, and if so, with which method the encryption is to be carried out. This information is relayed to the key management block KM.

In the initial stage, the user has determined those connections for the security policy block, on which encryption must be used. If the security policy block states that encryption must be used and if the key management block finds that there is as yet no key for the terminal with which a connection is desired, the key management block will send a key request to the Kerberos client KC, who will request a server ticket for the concerned terminal from the security server's ticket-granting service. This signalling is illustrated in FIG. 9. The terminal (the Kerberos client) sends to the ticket-granting server such a request in accordance with the Kerberos protocol, which contains the name (s, e.g. terminal B) of that server, for which the ticket is desired, a ticket $T_{c,tgs}$ encrypted with the ticket granting server's own key $K_{tgs}$ for access to the ticket-granting service and an authenticator Ac, which is encrypted with a connection-specific key $K_{c,tgs}$. The authenticator is a data structure, which contains the client's name and IP address as well as the current time. Observing the used method of marking Ac={c, c-addr, timestamp}.

The ticket-granting server checks the authenticators information and the ticket $T_{c,tgs}$. If the ticket is all right, the ticket-granting server generates a new random session key $K_{c,s}$, which the client may use together with a third party of his choice. Then the ticket-granting server forms a new ticket $T_{c,s}$ for the said third party, encrypts the ticket using the said third party's own key $K_s$, which is the same as the concerned subscriber's key Kc described above, and transmits the encrypted key together with the session key to the terminal. The entire reply is encrypted using key $K_{c,tgs}$.

Upon receiving the reply message, the terminal unpacks the packet, transmits the first part $\{T_{c,s}\}K_s$ to the third party (to terminal B) and stores the new session key $K_{c,s}$ in the key database. The terminal of the third party gets the recently generated session key $K_{c,s}$ from the ticket by first decrypting the ticket with its own key Kc. Thereafter the new session key is available to both terminals and encrypted data transmission may begin.

When the Kerberos client has started his activity (when the client is registered with the Kerberos server), it must inform the IP/MIP/IP-SEC layer that it is able to serve session key requests. By using the PF_KEY protocol, this is done in such a way that the Kerberos client opens a special socket address into the kernel of the operating system and registers with the kernel with a SADB_REGISTER message. Then the PF_KEY protocol sends a SADB_ACQUIRE message each time when the key is needed for some outbound interface. When receiving this message, the Kerberos client will act in the manner described above, that is, he sends a request to the ticket-granting server, of the received response it sends the part intended for the other party to the opposite end of the connection and relays the received session key to the key management block. In addition, the Kerberos client listens to a certain socket address in order to notice any tickets that may arrive from other objects in the network. Having received such a ticket packet, it acknowledges reception of the packet, unpacks the packet and relays the necessary keys to the key management system, whereby these keys can be used when connections exist with the concerned peer.

When the terminal detaches from the network (message MOB_DETACH), the security server will remove both registrations from the Kerberos server.

In practice, the terminal and the security server must have certain port numbers open for non-encrypted data transmission. Such ports are the port, through which authentication messages are transmitted between the terminal and the server (FIG. 4), the port, through which tickets are transferred to the Kerberos clients, and the port, through which ticket requests are transferred.

The authentication triplet can be sought in various ways. In a small-scale embodiment it is possible to use a virtual "HLR database", wherein a suitable number of authentication triplets is stored in advance. E.g. 10000 triplets from each user would require 280 kilobytes of memory per user. Thus, e.g. a 6 GB disk could accommodate authentication triplets for more than 21000 users. The authentication triplets may be loaded in advance when the user gets the service, by leaving the SIM module for a few hours in a smart card reader, which supplies the challenges to the module. The authentication triplets formed of the obtained responses are stored in the database using the module's information. This method also works with all SIM modules, irrespective of the operators. The database may be located e.g. in connection with the security server. Thus, it is not necessary to seek the authentication triplet(s) from the mobile communications network, but subscriber-specific authentication triplets can be stored in advance in a database DB located in connection with the security server (compare with FIG. 1). This means that proxy servers are not necessarily needed at all. For some subscribers there may also be ready-made authentication triplets in the database and for some they may be fetched in real time from the mobile communications system. Authentication triplets can also be fetched in advance from the mobile communications system and placed in the database.

In principle, it is also possible to copy each user's SIM module and use the copy in connection with the security server for authentication of the user (whereby no inquiry is made from the mobile communications network).

These two methods described above make it possible for the used SIM modules to be modules dedicated solely for this purpose, and they do not necessarily relate to the mobile communications network's subscriber.

The necessary authentication data can also be obtained from the GSM network e.g. from the connection between the MSC (Mobile Switching Centre) and the BSC (Base Station Controller). Thus, the proxy server need not necessarily emulate the visitor location register VLR, as was presented above, but it may also function as a network element of the same kind as the GSM network's base station controller. Such an alternative is illustrated in FIG. 10, where the said network element is marked with the reference mark BP. In this case, the proxy server is thus a virtual base station controller, which is connected to the MSC (Mobile Switching Centre) in the same way as the GSM network's normal BSCs (Base Station Controllers). Looking from the mobile switching centre, the proxy server looks like an ordinary base station controller at least as regards the signalling relating to authentication.

However, it is a problem in this, second alternative that it requires considerably more complex signalling between the proxy server and the GSM network than the first alternative (FIG. 1). Besides, in consequence of the authentication of the second alternative, the user will in the GSM system move into the area of the proxy server BP emulating a base station controller, but this is not a real base station controller in the sense that it would be able also to switch calls. Thus, this solution can be used only in connection with data services, and the terminal can not be the kind of dual mode equipment as mentioned above.

Although the invention was described in the foregoing with reference to a MIP enabled network, the solution according to the invention is not bound to this protocol. If the protocol to be used is IPv6; then there are no proper agents in the network. Hereby the information about when the user is in the network must be sought from the routing tables of the router in the user's home network. In practice, this means that the network must include a separate "locating agent", which by monitoring or "pinging" the router will notice that the user has entered the network and in consequence of this will start authentication by sending to the security server a message (MOB_ATTACH) about the new user. It is probable, however, that router manufacturers are designing a protocol from which it emerges when the user is in the network.

Although the invention was described above with reference to the examples shown in the appended drawings, it is obvious that the invention is not limited to these, but it may be modified within the inventive idea presented in the appended claims. Authentication need not necessarily be performed in order to set up an encrypted connection between users, but as a result of a successful authentication one may perform e.g. registration with a mail server before transmitting e-mail messages to the user's machine. In this way a more reliable authentication is achieved than by the present methods based on passwords. In addition, in connection with the access points there may be local servers, which function as proxy servers for the security server proper, or the system may include more than one security server. Instead of the Kerberos system it is also possible to use e.g. public key management, which is based on a x.500-database and on x.509 certificates.

The invention claimed is:

1. A method, comprising:
   in a network terminal, using a subscriber identity module wherein a response is obtained as a result of a challenge given to the identity module as input, the method being used for authenticating an identity of a subscriber attached to a network;
   using a special security server in the network so that when a terminal attaches to the network, a message of a new user is transmitted to the security server;
   fetching subscriber authentication information corresponding to the new user from the mobile communications system to the network, the authentication information comprising at least a challenge and a response; and
   performing authentication based on the authentication information obtained from the mobile communications system by transmitting the challenge to the terminal through the network for storage on the terminal to ensure by the terminal that the challenge is used once, by checking at the terminal that the challenging is unique from challenges used in previous authentication exchanges wherein the terminal only responds to the challenge if the challenge had not been previously transmitted to the terminal, by generating, if the challenge is unique, a response from the challenge in the identity module of the terminal and by comparing the generated response with the response received from the mobile communications system.

2. The method as defined in claim 1, further comprising starting the fetching of the subscribers authentication information from the mobile communications system from the security server in response to the message.

3. The method as defined in claim 1, wherein in response to a successful authentication, the method comprises performing registration of the subscriber as a client of a separate key management system.

4. The method as defined in claim 3, further comprising using a Kerberos system as the key management system.

5. The method as defined in claim 4, further comprising:
   configuring the subscriber-specific authentication information obtained from the mobile communications system to also include a key; and
   registering the subscriber as a client of the Kerberos system so that the key is registered (a) as the clients password and (b) as a password for a service formed for the clients IP address or for a subscriber identity used in the mobile communications system.

6. The method as defined in claim 1, further comprising fetching the subscribers authentication information with the aid of a separate proxy server, which functions as a network element emulating a visitor location register of the mobile communications system and which requests the authentication information from an authentication center located in connection with a subscribers home location register in the same way as the mobile communications system's own visitor location register.

7. The method as defined in claim 1, further comprising fetching the subscribers authentication information with the aid of a separate proxy server, which functions as a network element emulating the mobile communications system's base station controller and which is in connection with the mobile communications system's mobile switching centre for fetching the authentication information from an authentication center located in connection with a subscribers home location register in the same way as the authentication information is fetched to the mobile communications system's own base station controller.

8. An authentication system comprising an authentication unit, comprising:
   a subscriber identity module connected to a network terminal, wherein, a response can be determined from a challenge given to the identity module as input;
   a messaging unit configured to send a message when a terminal attaches to the network;
   a special security server for receiving the message;
   a requesting unit configured to request authentication information corresponding to a subscriber from the mobile communications system, which information comprises at least a challenge and a response;
   on the side of the network, a data transmission unit configured to transmit the challenge through the network to the identity module; for storage on the terminal to ensure by the terminal that the challenge is used once,
   a checking unit configured to check, at the terminal, that the challenge is unique from challenges used in previous authentication exchanges, wherein the terminal only responds to the challenge if the challenge had not been previously transmitted to the terminal and for returning a response generated from the unique challenge from the terminal to the network; and
   a comparing unit configured to compare the generated response with the response received from the mobile communications system.

9. The system as defined in claim 8, wherein the identity module is the subscriber identity module used in a GSM network.

10. The system as defined in claim 8, wherein the messaging unit is configured into a home agent in accordance with a mobile IP network.

11. The system as defined in claim 8, wherein the requesting unit includes the security server and a proxy server, which is connected to a GSM network.

12. The system as defined in claim 11, wherein the proxy server functions as a network element emulating the visitor location register of the GSM network.

13. The system as defined in claim 11, wherein the proxy server functions as a network element emulating the base station controller of the GSM network.

14. The system as defined in claim 11, wherein the system further includes a Kerberos server, wherein the user of the server the will be registered as a result of a successful authentication.

15. An authentication method, comprising:
   in a network terminal, using a subscriber identity module, wherein a response is obtained as a result of a challenge given to the identity module as input, the authentication method being used for authenticating an identity of a subscriber attached to a network;
   storing subscriber-specific authentication information in a database, the information comprising at least a challenge and a response;
   using a special security server in the network so that when a terminal attaches to the network, a message about the new user is transmitted to the security server;
   in response to the message, retrieving authentication information of the subscriber corresponding to the new user from the database; and
   performing authentication based on the authentication information obtained from the database by transmitting the challenge through the network to the terminal for storage on the terminal to ensure by the terminal that the challenge is used once, by checking, in the network terminal, that the challenging is unique from challenges used in previously authentication exchanges, wherein the terminal only responds to the challenge if the challenge had not been previously transmitted to the terminal, by generating, if the challenge is unique, a response from the challenge in the identity module of the terminal, and by comparing the response with the response obtained from the database.

16. The method as defined in claim 15, further comprising storing the database in connection with the security server.

17. The method as defined in claim 15, wherein in response to a successful authentication, the method comprises performing registration of the subscriber as the user of a separate key management system.

18. The method as defined in claim 17, further comprising using aKerberos system as the key management system.

19. An authentication system comprising an authentication unit which comprises:
   a subscriber identity module connected to a network terminal, a response can be determined from the challenge given as input to the identity module, the authentication unit being used for authentication of the identity of a subscriber attached to a network;
   a messaging unit configured to send a message when a terminal attaches to the network;
   a special security server for receiving the message;
   a database unit which include a database configured to store subscriber-specific authentication information, the information comprises at least a challenge and a response, and a retrieval unit configure to retrieve subscriber-specific authentication information from the database in response to the message;
   on the side of the network, a data transmission unit configured to transmit the challenge through the network to the identity module; for storage on the terminal to ensure by the terminal that the challenge is used once,
   at the terminal, a checking unit configured to check that the challenge is unique from challenges used in previous authentication exchanges, wherein the terminal only responds to the challenge if the challenge had not been previously transmitted to the terminal if the challenge is unique, for returning the response generated from the unique challenge from the terminal to the network; and
   a comparing unit configured to compare the received response with the response received from the database.

20. The system as defined in claim 19, wherein the identity module is a subscriber identity module in a GSM network.

21. The system as defined in claim 19, wherein the messaging unit is configured into a home agent in accordance with the mobile IP network.

22. The system as defined in claim 19, wherein the system further includes a Kerberos server, which is known as such and as the client of which the subscriber is registered as the result of a successful authentication.

23. A method, comprising:
receiving a challenge through a communication network to which a terminal is attached, the challenge being provided in a subscriber authentication information corresponding to the subscriber and obtained from a mobile communications system, the subscriber authentication information comprises at least the challenge and a response;
storing the challenge on the terminal;
checking that the challenge is unique from challenges used in previous authentication exchanges and that the challenge was not previously stored on the terminal;
generating a response from the challenge, if the challenge is unique and was not previously stored on the terminals wherein the terminal only responds to the challenge if the challenge had not been previously transmitted to the terminal; and
transmitting the response generated from the challenge to the communication network for comparing the generated response with the response in the subscriber authentication information received from the mobile communications system.

24. A method, comprising:
receiving a challenge through a communication network to which a terminal is attached, the challenge being provided in a subscriber authentication information corresponding to the subscriber and obtained from a mobile communications system, the subscriber authentication information comprises at least the challenge and a response;
checking, at the terminal, that the challenge is unique from challenges used in previous authentication exchanges, wherein the terminal only responds to the challenge if the challenge had not been previously transmitted to the terminal;
generating a response from the challenge, if the challenge is unique; and
transmitting the response generated from the challenge to the communication network for comparing the generated response with the response in the subscriber authentication information received from the mobile communications system.

25. An authenticating device being configured to:
receive a challenge through a communication network to which a terminal is attached, the challenge being provided in a subscriber authentication information corresponding to the subscriber and obtained from a mobile communications system, the subscriber authentication information comprises at least the challenge and a response;
access challenges stored on the terminal, wherein challenges used in previous authentication exchanges are stored on the terminal;
check that the challenge is unique from the challenges used in previous authentication exchanges and that the challenge was not previously stored on the terminal, wherein the terminal only responds to the challenge if the challenge had not been previously transmitted to the terminal;
generate a response from the challenge, if the challenge is unique and was not previously stored on the terminal; and
transmit the response generated from the challenge to the communication network for comparing the generated response with the response in the subscriber authentication information received from the mobile communications system.

26. An authenticating device being configured to:
receive a challenge through a communication network to which a terminal is attached, the challenge being provided in a subscriber authentication information corresponding to the subscriber and obtained from a mobile communications system, the subscriber authentication information comprises at least the challenge and a response;
check that the challenge is unique from the challenges used in previous authentication exchanges, wherein the terminal only responds to the challenge if the challenge had not been previously transmitted to the terminal;
generate a response from the challenge, if the challenge is unique; and
transmit the response generated from the challenge to the communication network for comparing the generated response with the response in the subscriber authentication information received from the mobile communications system.

27. An authenticating apparatus, comprising:
receiving means for receiving a challenge through a communication network to which a terminal is attached, the challenge being provided in a subscriber authentication information corresponding to the subscriber and obtained from a mobile communications system, the subscriber authentication information comprises at least the challenge and a response;
accessing means for accessing challenges stored on the terminal, wherein challenges used in previous authentication exchanges are stored on the terminal; checking means for checking that the challenge is unique from the challenges used in previous authentication exchanges and that the challenge was not previously stored on the terminals, wherein the terminal only responds to the challenge if the challenge had not been previously transmitted to the terminal;
generating means for generating a response from the challenge, if the challenge is unique and was not previously stored on the terminal; and
transmitting means for transmitting the response generated from the challenge to the communication network for comparing the generated response with the response in the subscriber authentication information received from the mobile communications system.

28. An authenticating apparatus, comprising:
receiving means for receiving a challenge through a communication network to which a terminal is attached, the challenge being provided in a subscriber authentication information corresponding to the subscriber and obtained from a mobile communications system, the subscriber authentication information comprises at least the challenge and a response;
checking means for checking that the challenge is unique from the challenges used in previous authentication exchanges, wherein the terminal only responds to the challenge if the challenge had not been previously transmitted to the terminal;
generating means for generating a response from the challenge, if the challenge is unique; and
transmitting means for transmitting the response generated from the challenge to the communication network for comparing the generated response with the response in the subscriber authentication information received from the mobile communications system.

29. A terminal configured to:

receive a challenge through a communication network to which a terminal is attached, the challenge being provided in a subscriber authentication information corresponding to the subscriber and obtained from a mobile communications system, the subscriber authentication information comprises at least the challenge and a response;

access stored challenges, wherein challenges used in previous authentication exchanges are stored on the terminal;

check that the challenge is unique from the challenges used in previous authentication exchanges and that the challenge was not previously stored on the terminal, wherein the terminal only responds to the challenge if the challenge had not been previously transmitted to the terminal;

generate a response from the challenge, if the challenge is unique and was not previously stored on the terminal; and transmit the response generated from the challenge to the communication network for comparing the generated response with the response in the subscriber authentication information received from the mobile communications system.

30. A terminal configured to:

receive a challenge through a communication network to which a terminal is attached, the challenge being provided in a subscriber authentication information corresponding to the subscriber and obtained from a mobile communications system, the subscriber authentication information comprises at least the challenge and a response;

check that the challenge is unique from the challenges used in previous authentication exchanges, wherein the terminal only responds to the challenge if the challenge had not been previously transmitted to the terminal;

generate a response from the challenge, if the challenge is unique; and transmit the response generated from the challenge to the communication network for comparing the generated response with the response in the subscriber authentication information received from the mobile communications system.

* * * * *